United States Patent [19]

Omura

[11] Patent Number: 5,295,712
[45] Date of Patent: Mar. 22, 1994

[54] CONTROL OF A VEHICLE RESTRAINING SYSTEM HAVING AN AIR BAG IN A RETRACTABLE STEERING COLUMN

[75] Inventor: Hideo Omura, Yokosuka City, Japan

[73] Assignee: Nissan Motor Co., Ltd., Yokohama City, Japan

[21] Appl. No.: 987,720

[22] Filed: Dec. 8, 1992

[30] Foreign Application Priority Data

Dec. 11, 1991 [JP] Japan .................................. 3-327490

[51] Int. Cl.⁵ .......................... B60R 21/32; B62D 1/18
[52] U.S. Cl. .................................... 280/777; 280/735; 280/732; 280/731
[58] Field of Search ............... 280/777, 735, 734, 731, 280/732, 728 R; 74/492

[56] References Cited

U.S. PATENT DOCUMENTS

| | | | |
|---|---|---|---|
| 4,243,248 | 1/1981 | Scholz et al. | 280/735 |
| 4,968,058 | 11/1990 | Jones | 280/777 |
| 5,054,810 | 10/1991 | Backhaus et al. | 280/777 X |
| 5,082,311 | 1/1992 | Melotik | 280/777 |
| 5,184,845 | 2/1993 | Omura | 280/735 |

FOREIGN PATENT DOCUMENTS

| | | | |
|---|---|---|---|
| 0477509 | 4/1992 | European Pat. Off. | 280/777 |
| 3-64166 | 3/1991 | Japan . | |
| 4113954 | 4/1992 | Japan | 280/735 |
| 4-300776 | 10/1992 | Japan . | |

Primary Examiner—Margaret A. Focarino
Assistant Examiner—Peter English
Attorney, Agent, or Firm—Lowe, Price, LeBlanc & Becker

[57] ABSTRACT

An air-bag type passenger restraining device for a motor vehicle comprises a vehicle collision sensor which issues a first instruction signal when detecting a vehicle collision; an air-bag which is located in front of a seat of the vehicle and instantly inflated when receiving a second instruction signal; an air-bag retreating device which instantly retreats the air-bag in a direction away from the seat when receiving a third instruction signal; and a control unit for producing the second and third instruction signals upon receiving the first instruction signal. The control unit issues the third instruction signal for starting the air-bag retreating device after the air-bag is inflated to such a degree as to effect an initial restraint to a passenger on the seat due to issuance of the second instruction signal therefrom.

18 Claims, 10 Drawing Sheets

CONTROL OF A VEHICLE RESTRAINING SYSTEM HAVING AN AIR BAG IN A RETRACTABLE STEERING COLUMN

BACKGROUND OF THE INVENTION

1. Field of the Invention

The present invention relates in general to a vehicle device which restrains vehicle passengers in the event of a vehicle collision, and more particularly, to an air-bag type passenger restraining device which includes an air-bag mounted on a holder and means which, upon a vehicle collision, moves the air-bag holder away from a seated passenger.

2. Description of the Prior Art

Figure 17:
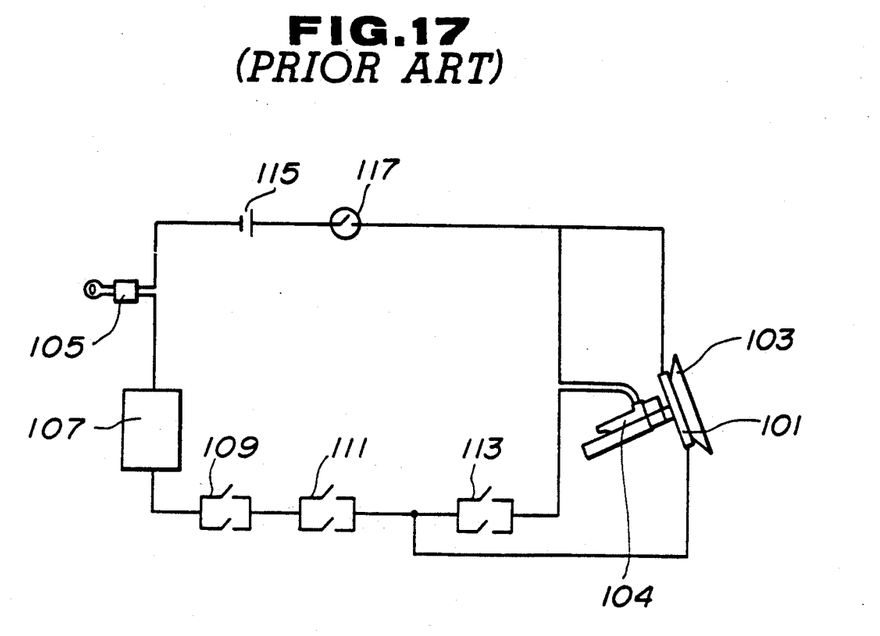
FIG. 17 is a block diagram of a conventional air-bag type restraining device.

In order to clarify the task of the present invention, one vehicle device of the above-mentioned type will be outlined with reference to FIG. 17, which device was proposed by the same applicant through Japanese Patent Application No. 3-64166.

The device comprises generally an air-bag 101 installed in a steering wheel 103, a steering wheel retreating device 104 and a controller which controls operation of the air-bag 101 and the retreating device 104. Upon a vehicle collision, the controller functions so that the air-bag 101 is instantly inflated and at the same time the retreating device 104 retreats the steering wheel 103 by a given distance in a direction to increase a space between the steering wheel 103 and the passenger (viz., driver). The controller comprises an ignition switch 105, a judge circuit 107, a front sensor switch 109, a center sensor switch 111, a column switch 113, a battery 115 and a mercury switch 117. As shown, these parts constitute a first circuit which controls the air-bag 101 and a second circuit which controls the steering wheel retreating device 104.

When, due to a vehicle collision or the like, the front and center sensor switches 109 and 111 are actuated, the judge circuit 107 judges the collision and instantly ignites an inflater (not shown) of the air-bag 101. At the same time, the column switch 113 is actuated to energize the steering wheel retreating device 104 and thus the steering wheel 103 (more specifically, the steering column) is retreated by a given degree.

Because of enlargement of the space between the steering wheel 103 and the passenger upon the vehicle collision, the air-bag 101 can be inflated freely and easily within the space.

In the above-mentioned air-bag type restraining device, the retreat of the steering wheel 103 starts when the air-bag inflater is ignited. However, such retreat tends to induce a phenomenon wherein the practical passenger restraint by the inflated air-bag 101 is effected after the air-bag 101 has come to the retreated position. In this case, the passenger is forced to strongly bump against the air-bag 101. In fact, under such condition, it is difficult to provide the air-bag 101 with a so-called "passenger soft holding" irrespective of the enlargement of the space for the air-bag 101.

Figure 18:
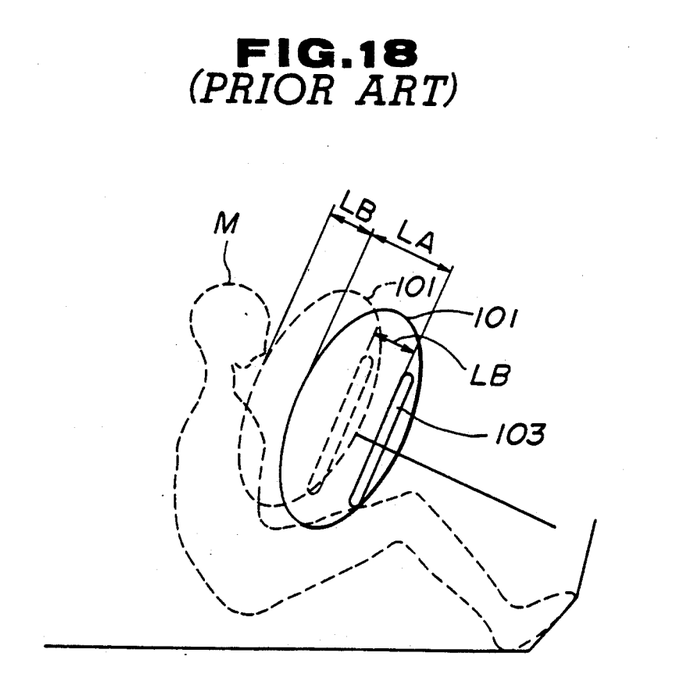
FIG. 18 is a schematic illustration showing a condition wherein a passenger is actually restrained by the conventional passenger restraining device.

Furthermore, due to its inherent arrangement, the size (or stroke) of the air-bag 101 (more specifically, the thickness of the inflated air-bag) must be increased in accordance with the enlargement of the space. This will be understood from FIG. 18 which shows, by broken and solid lines, two positions of the inflated air-bag 101 on the steering wheel 103. The position shown by the broken line is the position which is taken by the inflated air-bag 101 just before the retreat of the steering wheel 103, while the position shown by the solid line is the position which is taken by the inflated air-bag 101 upon completion of the retreat. The stroke of the air-bag 101 is denoted by reference "LA" and the degree of the retreat of the steering wheel 103 is denoted by reference "LB". As is seen from the drawing, in order to provide the inflated air-bag 101 with "a sufficient passenger soft holding function", it is necessary to increase the thickness of the inflated air-bag 101 by a degree corresponding to the retreat "LB" of the steering wheel 103. This induces a bulky construction of the air-bag system.

SUMMARY OF THE INVENTION

It is therefore an object of the present invention to provide an air-bag type passenger restraining device which is free of the above-mentioned drawbacks.

That is, according to the present invention, there is provided a measure in which an instruction signal for retreating the air-bag is issued after the air-bag is inflated to such a degree as to effect an initial restraint to a passenger.

According to the present invention, there is provided an air-bag type passenger restraining device for use in a motor vehicle having a seat. The restraining device comprises a vehicle collision detecting means which issues a first instruction signal when detecting a vehicle collision; an air-bag which is located in front of the seat and instantly inflated when receiving a second instruction signal; an air-bag retreating device which instantly retreats the air-bag in a direction away from the seat when receiving a third instruction signal; and control means for producing the second and third instruction signals upon receiving the first instruction signal, the control means issuing the third instruction signal for starting the air-bag retreating device after the air-bag is inflated due to issuance of the second instruction signal therefrom.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Throughout the specification, substantially same parts and constructions are denoted by the same numerals, and repeated explanation of them will be omitted for ease of description.

Figure 1:
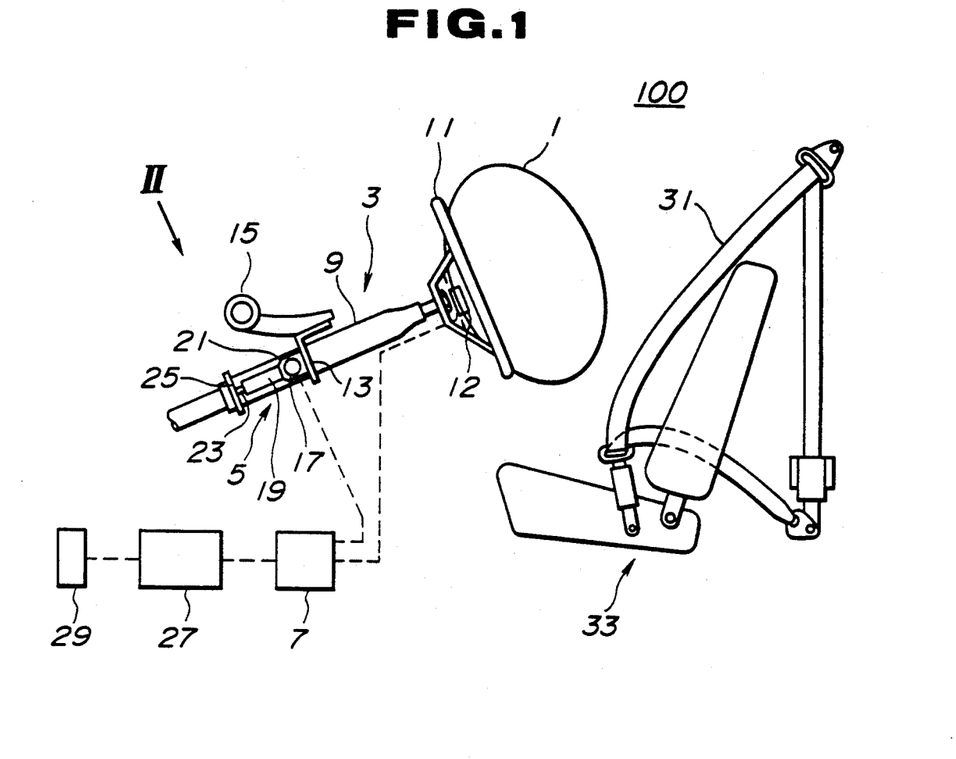
FIG. 1 is a schematically illustrated side view of an air-bag type passenger restraining device, which is a first embodiment of the present invention.

Referring to FIGS. 1 to 6, particularly FIG. 1, there is shown an air-bag type passenger restraining device 100 which is a first embodiment of the present invention.

As shown, the device 100 is arranged to restrain a passenger (viz., driver) seated on a driver's seat 33. As shown, the seat 33 is equipped with a three point suspended type seat belt 31.

The restraining device 100 comprises an air-bag 1 which is inflated upon a vehicle collision, and a steering wheel retreating device 5 which retreats a steering wheel 11 on which the air-bag 1 is mounted. Designated by numeral 7 is a timing adjusting circuit which adjusts the operation timing of the air-bag 1 and the steering wheel retreating device 5.

The steering wheel 11 is mounted on a head portion of an upper column 9 for a steering column 3. The air-bag 1 when folded is neatly embedded in a center pad of the steering wheel 11. Designated by numeral 12 is an inflater which is mounted to the air-bag 1 for inflating the same. The inflater has an igniter connected thereto.

The steering column 3 is connected through an upper bracket 13 to a steering member 15 which is mounted in a front fixed part of the associated motor vehicle.

The steering wheel retreating device 5 is constructed to axially move the steering column in a forward direction upon a vehicle collision.

Figure 2:
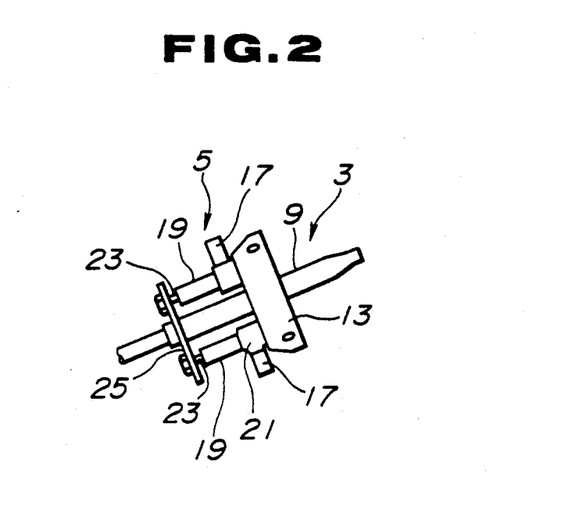
FIG. 2 is a view of a steering wheel retreating device employed in the first embodiment, which view is taken from the direction of the arrow "II" of FIG. 1.

That is, as is seen from FIGS. 1 and 2, the steering wheel retreating device 5 comprises two parallel piston units each including a cylinder 19, a piston installed in the cylinder 19 and a piston rod 23 extending from the piston. Although not shown in the drawings, the interiors of the cylinders 19 are connected to each other through a conduit. Base portions of the two parallel cylinders 19 are connected to the upper bracket 13 and leading ends of the piston rods 23 are secured to a bracket 25 which is secured to a lower portion of the upper column 9. The interior of each cylinder 19 is connected to one explosion unit 17 through a joint portion 21. The explosion unit 17 includes an explosive and an igniter. Thus, when the explosive of at least one piston unit explodes, the internal pressure of the corresponding cylinder 19 is instantly increased causing instant extension of the corresponding piston rod 23. This induces instant forward movement of the upper column 9, that is, instant retreat of the steering wheel 11.

The timing adjusting circuit 7 is a part of a microcomputer. A collision sensor 29 is connected through a judge circuit 27 to an input section of the timing adjusting circuit 7. An output section of the timing adjusting circuit 7 is connected through respective cables to the igniter of the inflater 12 and the igniters of the explosion units 17.

By analyzing an information signal from the collision sensor 29, the judge circuit 27 makes a judgment as to whether the air-bag 1 and the steering wheel retreating device 5 should be operated or not. If judged "Yes", the judge circuit 27 issues an ignition instruction signal to the timing adjusting circuit 7.

Upon receiving such signal, the timing adjusting circuit 7 outputs a first ignition instruction signal to the igniter of the inflater 12 and, after a predetermined small period of time from the issuance of the first signal, the timing adjusting circuit 7 outputs a second ignition instruction signal to the igniters of the explosion units 17.

In this first embodiment, the ignition of the igniters of the explosion units 17 takes place after the air-bag 1 completes the inflation to effect an initial restraint to the passenger (viz., driver) who is sitting normally on the seat 33.

The collision sensor 29, the judge circuit 27 and the timing adjusting circuit 7 are so arranged as to provide the igniter of the inflater 12 with the first ignition instruction signal as soon as a vehicle collision occurs.

In the following, operation of the restraining device 100 of the first embodiment will be described.

When, due to a vehicle collision or the like, the collision sensor 29 issues a collision representing signal, the judge circuit 27 analyzes the signal to determine whether the air-bag 1 and the steering wheel retreating device 5 should be operated or not. If Yes, that is, when the judge circuit 27 judges the necessity of operation of the air-bag 1 and the steering wheel retreating device 5, the judge circuit 27 issues an ignition instruction signal to the timing adjusting circuit 7.

Upon receiving such signal, the timing adjusting circuit 7 instantly issues the first signal to the igniter of the inflater 12 for instantly inflating the air-bag 1 and then with a given delayed timing, the timing adjusting circuit 7 issues the second signal to the igniters of the explosion units 17 for retreating the steering wheel 11. It is to be noted that the retreat of the steering wheel 1 starts just after completion of the inflation of the air-bag 1.

Figure 3:
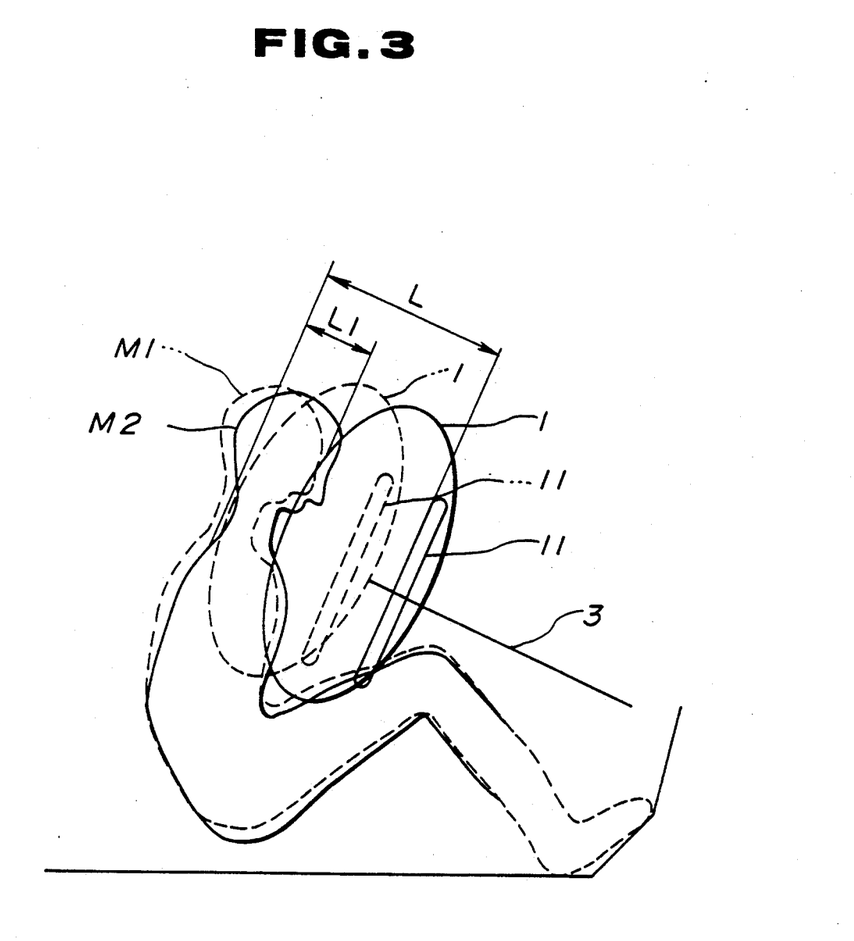
FIG. 3 is a schematic illustration showing a condition wherein a passenger is actually restrained by the restraining device of the first embodiment.

The above-mentioned operation is easily understood from FIG. 3 which shows a condition wherein a passenger (viz., driver) is actually restrained by the restraining device upon a vehicle collision.

In the drawing, reference "M1" denotes the position, illustrated by broken line, which is taken by the passenger just before starting of the retreat of the steering wheel 11. According to experiments, it has been revealed that such position "M1" is taken after about 60 msec. (viz., millisecond) from a vehicle collision. While, reference "M2" denotes the position, illustrated by solid line, which is taken by the passenger after completion of the retreat of the steering wheel 11. According to the experiments, it has been revealed that such position "M2" is taken after about 75 msec. from the vehicle collision.

Upon a vehicle collision, the air-bag 1 is instantly inflated as shown by the broken line and thus the passenger is at first held by the inflated air-bag 1. During this air-bag inflation, the retreat of the steering wheel 11 does not occur. That is, upon the vehicle collision, the passenger is given an initial restraint by the inflated air-bag 1. Under this condition, as is seen from the drawing, the head of the passenger is sunk into the inflated air-bag 1 by the degree "L1" leaving a sufficient distance between the passenger's head and the steering wheel 11. Thus, the passenger's head is avoided from colliding against the steering wheel 11. Because of the retreat of the steering wheel 11 which will timely follow, the pressure increase in the air-bag 1 caused by the hit of the passenger's head against the same has a small effect on the passenger's head, and thus the counterforce applied to the passenger by the air-bag 1 is small. That is, at the initial stage of the passenger restraint by the air-bag 1, the deceleration of the passenger's head is effectively damped.

Thereafter, that is, after about 15 msec. from the hit of the passenger's head against the inflated air-bag 1, the steering wheel 1 is retreated fast due to operation of the steering wheel retreating device 5 and takes the position as illustrated by the solid line. During this retreat, the passenger's head continues to be held by the inflated air-bag 1 because of the inertia caused by the vehicle collision. Thus, a so-called "effective thickness" (or effective stroke) of the inflated air-bag 1 is increased to "L" which is greater than the real thickness of the inflated air-bag 1. That is, the marked inertia applied to the passenger due to the vehicle collision is smoothly damped by using the longer effective thickness of the air-bag 1.

Figure 4:
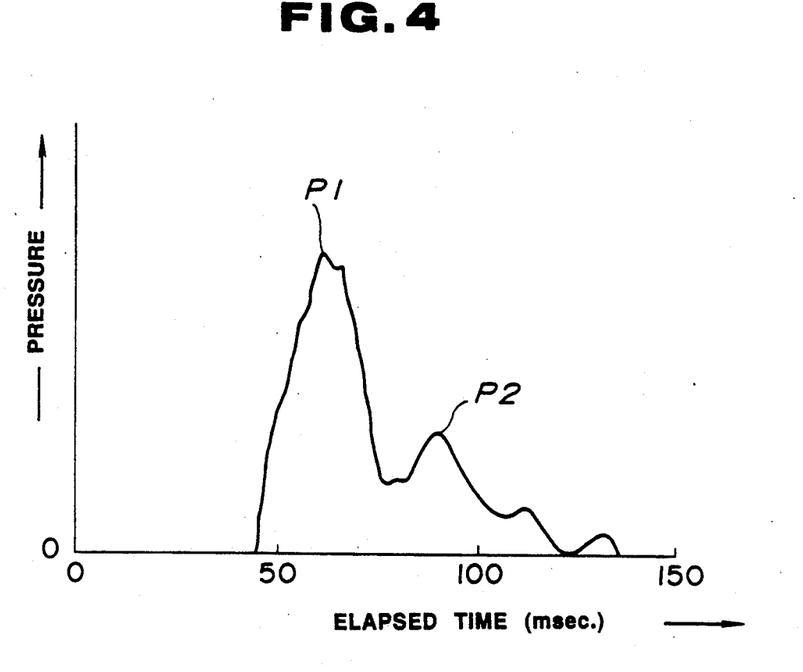
FIG. 4 is a graph showing a pressure change in the air-bag of the first embodiment at the time when, due to a vehicle collision, the air-bag is inflated.

FIG. 4 is a graph showing the pressure in the air-bag 1 upon a vehicle collision with respect to elapsed time. In this graph, the first peak point "P1" denotes the pressure produced when the passenger is brought to the first restraint position "M1" (see FIG. 3), while, the second peak point "P2" denotes the pressure produced when the passenger is brought to the second restraint position "M2". As is seen from this graph, during the shock absorbing movement of the air-bag 1, two peaks "P1" and "P2" of the pressure in the air-bag 1 appear, but which have a small effect on the passenger due to the greater effective thickness (or effective stroke) of the air-bag 1.

Figure 5:
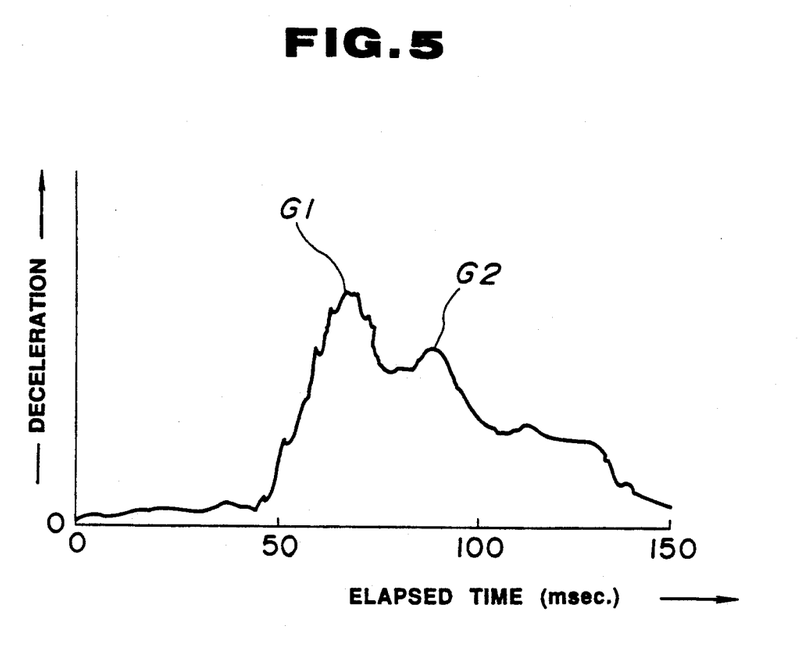
FIG. 5 is a graph showing a deceleration change of a passenger's head at the time when, due to a vehicle collision, the air-bag of the first embodiment is inflated.

FIG. 5 is a graph showing the deceleration of the passenger's head upon a vehicle collision with respect to elapsed time. The peak point "G1" denotes the deceleration which is produced when the passenger comes to the first position "M1" and the other peak point "G2" denotes the deceleration which is produced when the passenger comes to the second position "M2". Because of the same reason as mentioned hereinabove, these two peaks "G1" and "G2" of the deceleration are effectively damped.

Thus, in a vehicle collision, the shock applied to the passenger by the inflated air-bag 1 is effectively damped and thus the "passenger soft holding" is practiced by the air-bag 1. Because of the above-mentioned greater effective thickness of the inflated air-bag 1, there is no need of increasing the size (more specifically, the real thickness in inflated condition) of the air-bag 1.

Figure 6:
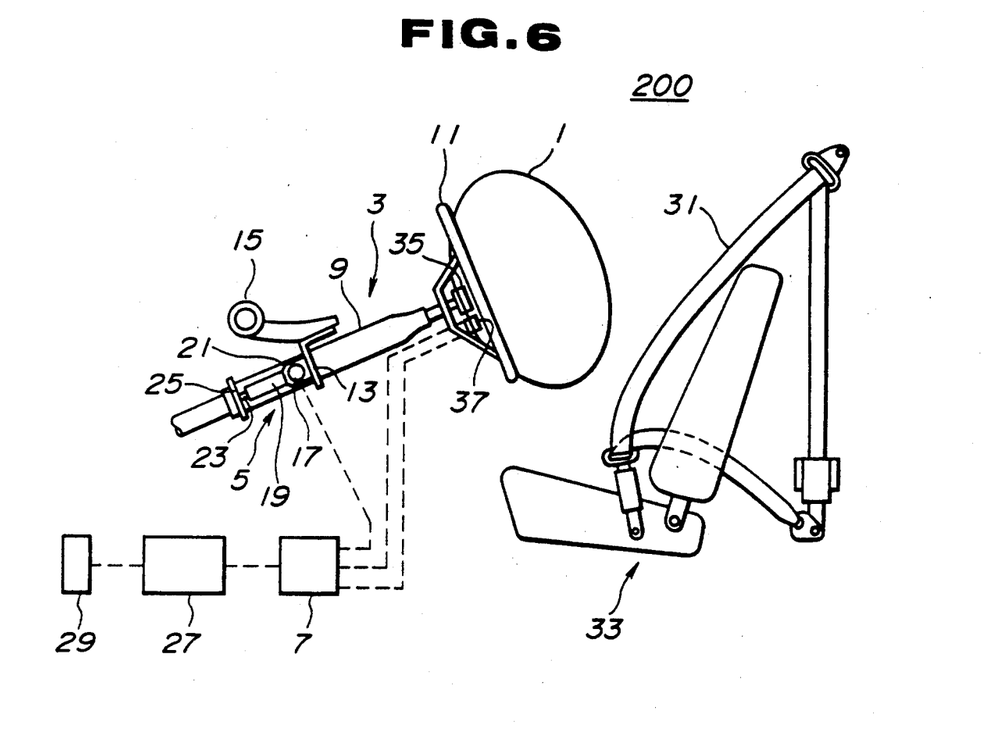
FIG. 6 is a view similar to FIG. 1, but showing a second embodiment of the present invention.
Figure 7:
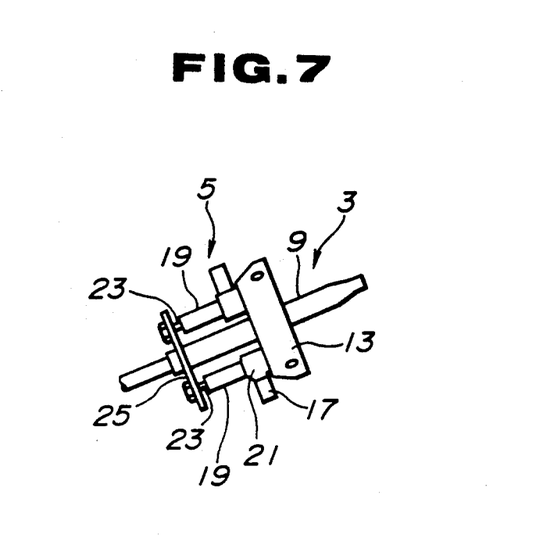
FIG. 7 is a side view of a steering wheel retreating device employed in the second embodiment.

Referring to FIGS. 6 to 9, particularly FIG. 6, there is shown an air-bag type passenger restraining device 200 which is a second embodiment of the present invention.

In the second embodiment, the inflation action of the air-bag 1 is carried out intermittently by using two, that is, first and second inflaters 35 and 37. The bag inflating ability of the first inflater 35 is smaller than that of the inflater 12 of the above-mentioned first embodiment. The inflaters 35 and 37 are mounted to the air-bag 1 and independently connected to the timing adjusting circuit 7. The timing adjusting circuit 7 issues with different timing respective ignition instruction signals to the igniters of the first and second inflaters 35 and 37.

That is, in this second embodiment, the first inflater 35 is ignited upon the judge circuit 27 judging the vehicle collision and thereafter the second inflater 37 is ignited at generally the same time as the explosion units 17 are ignited.

Thus, upon a vehicle collision, the first inflater 35 is ignited instantly to inflate the air-bag 1. The passenger is thus held by the inflated air-bag 1 at a first restraint position which is determined by the pressure in the inflated air-bag 1. Because the bag inflating ability of the first inflater 35 is small, the first peak of the pressure in the air-bag 1 can be effectively damped.

Thereafter, the second inflater 37 for the air-bag 1 and the explosion devices 17 are ignited at generally the same time. Due to the ignition of the explosion units 17, the steering wheel 11 is retreated instantly. By the ignition of the second inflater 37, undesired pressure drop in the air-bag 1, which would occur in the latter half of the passenger restraining process, is compensated.

Figure 8:
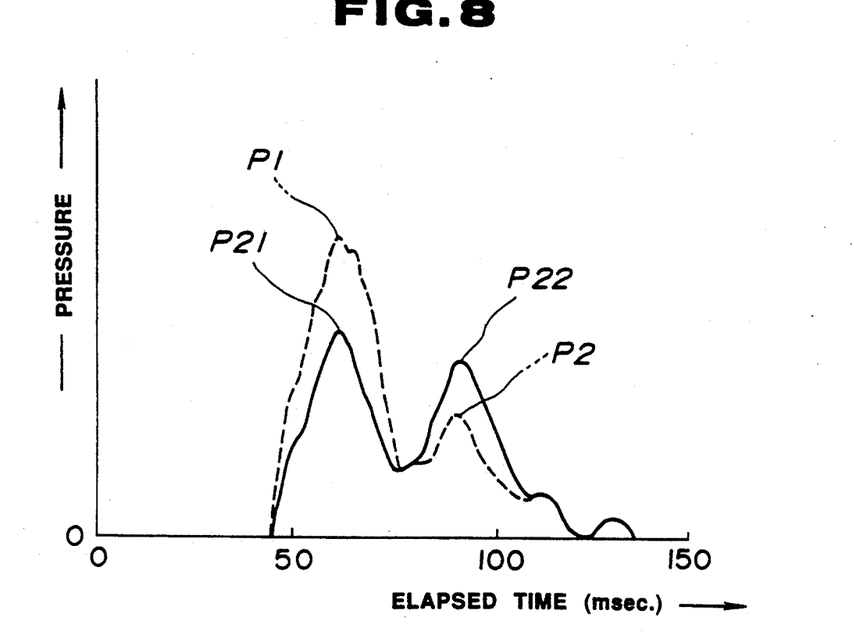
FIG. 8 is a graph similar to FIG. 4, but showing the pressure change in the air-bag in case of the second embodiment.

FIG. 8 is a graph showing by solid line curve the pressure change in the air-bag 1 of the second embodiment upon a vehicle collision. The curve illustrated by broken line shows the pressure change in case of the above-mentioned first embodiment. As is seen from this graph, the first peak point "P21" is lower than the first peak point "P1" of the first embodiment, while the second peak point "P22" is higher than the second peak point "P2" of the first embodiment. This means that in the second embodiment the shock absorbing is more smoothly achieved than that of the first embodiment.

Figure 9:
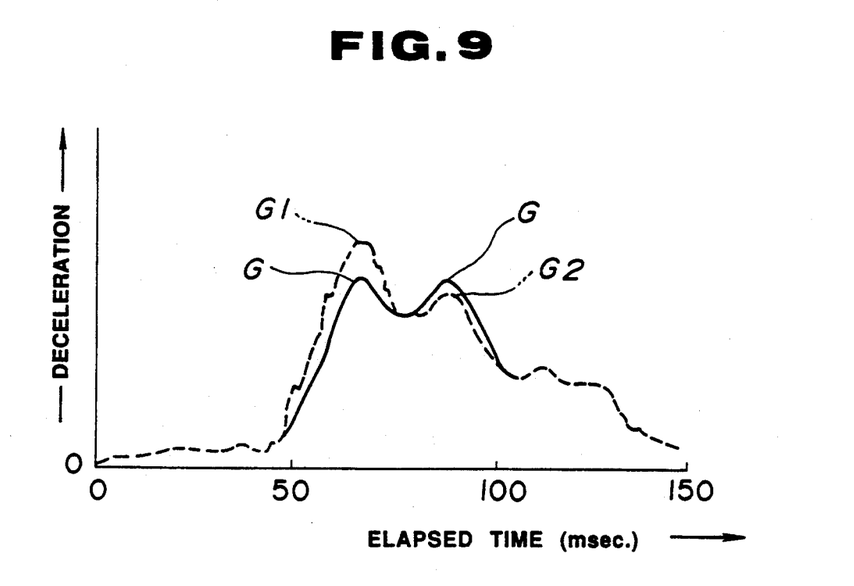
FIG. 9 is a graph similar to FIG. 5, but showing the deceleration change of the passenger's head in case of the second embodiment.

FIG. 9 is a graph showing by solid line curve the deceleration change of the passenger's head in the second embodiment upon the vehicle collision. The broken line curve shows the change in the first embodiment. First and second peak points "G21" and "G22" are lower and higher than the peak points "G1" and "G2" of those of the first embodiment. Lowering the first peak (which is the highest) of the deceleration can reduce the shock which is initially applied to the passenger.

Figure 10:
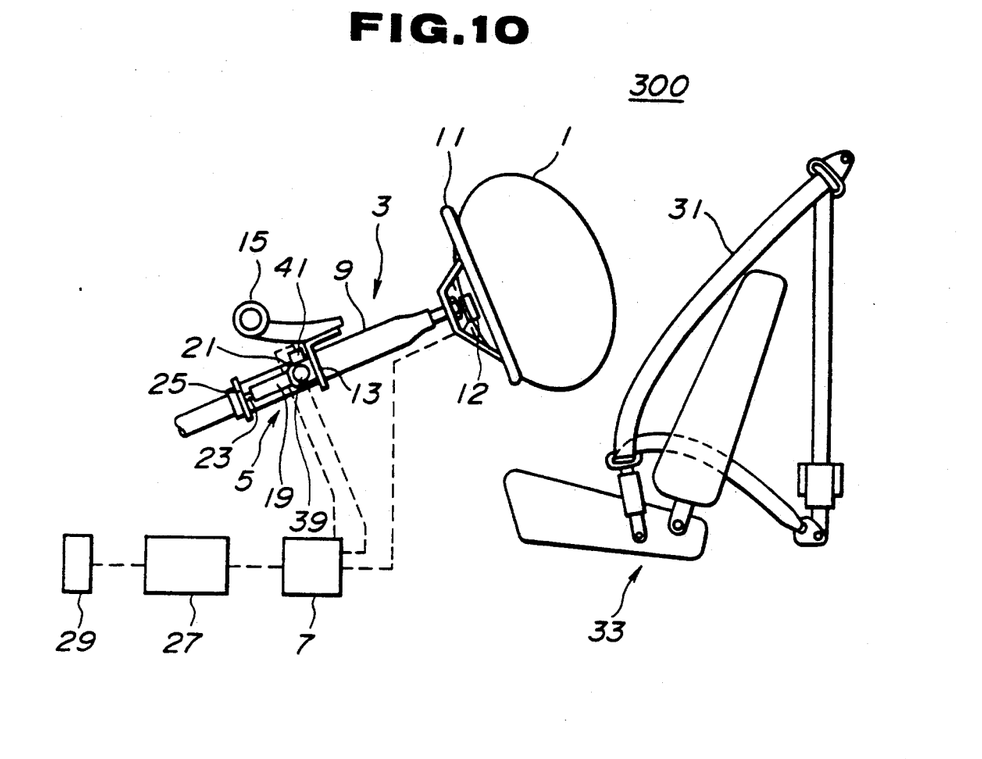
FIG. 10 is a view similar to FIG. 1, but showing a third embodiment of the present invention.

Referring to FIGS. 10 to 13, particularly FIG. 10, there is shown a third embodiment 300 of the present invention.

Figure 11:
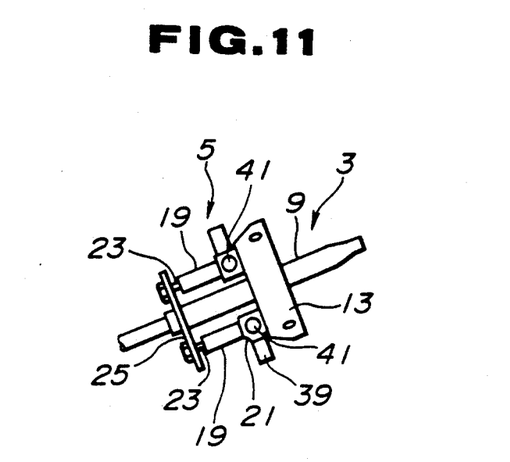
FIG. 11 is a side view of a steering wheel retreating device employed in the third embodiment.

In the third embodiment, the retreating movement of the steering wheel 11 is made intermittently by igniting two, viz., first and second explosion units 39 and 41 with different timing. For achieving such intermittent movement, the two cylinders 19 of the steering wheel retreating device 5 are isolated from each other, unlike the case of the above-mentioned first and second embodiments. The igniters of the first and second explosion units 39 and 41 are independently connected to the timing adjusting circuit 7. The timing adjusting circuit 7 issues with different timing respective ignition instruction signals to the two explosion units 39 and 41.

That is, in the third embodiment, upon the judge circuit 27 judging a vehicle collision, the inflater 12 is ignited to inflate the air-bag 1, then the first explosion unit 39 is ignited to retreat the steering wheel 11 by a certain degree and then the second explosion unit 41 is ignited to fully retreat the steering wheel 11. Thus, in this third embodiment, first, second and third restraint positions are taken by the passenger during the shock absorbing movement of the air-bag 1. Thus, the shock absorbing of the air-bag 1 is more smoothly achieved without increasing the pressure in the bag 1.

Figure 12:
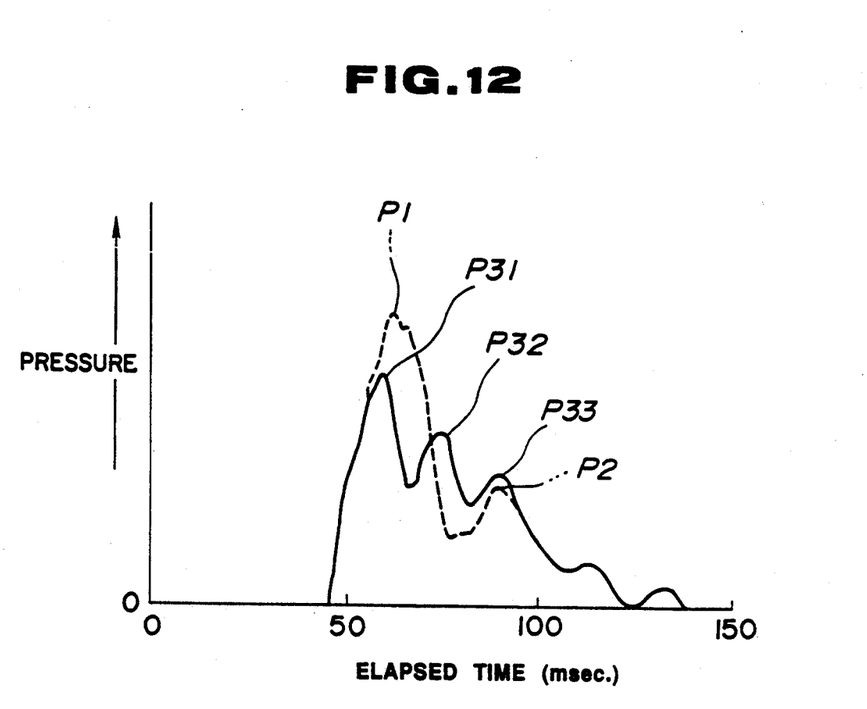
FIG. 12 is a graph similar to FIG. 4, but showing the pressure change in the air-bag in case of the third embodiment.
Figure 13:
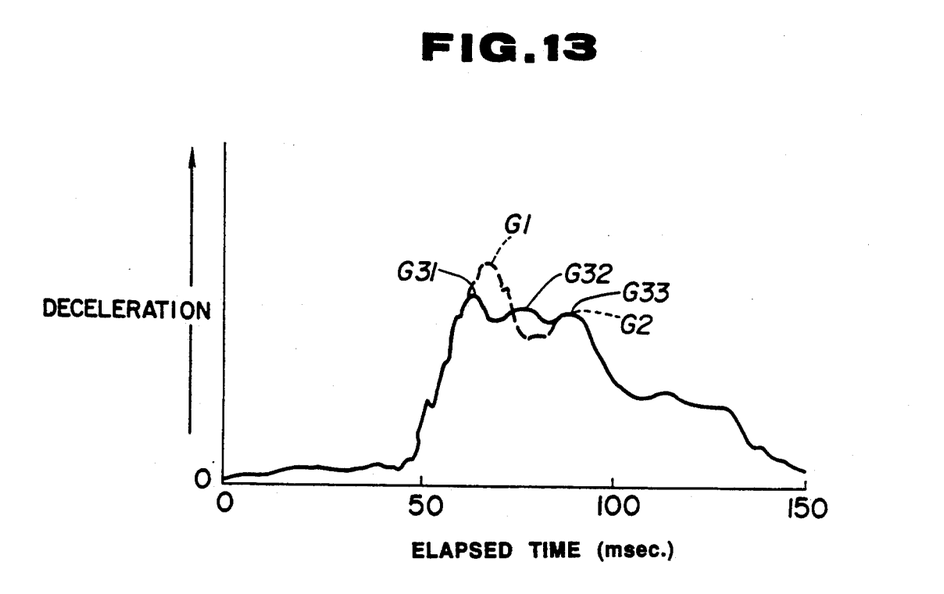
FIG. 13 is a graph similar to FIG. 5, but showing the deceleration change of the passenger's head in case of the third embodiment.

This advantageous phenomenon will be understood from FIGS. 12 and 13, which are graphs corresponding to FIGS. 4 and 5. The broken line curves in these graphs show the characteristics of the afore-mentioned first embodiment. As is seen from FIG. 12, first, second and third peak points "P31", "P32" and "P33" of the pressure in the air-bag 1 appear during the shock absorbing process of the air-bag 1. These peaks are sufficiently small as compared with the peak "P1", and thus, the shock absorbing is much smoothly carried out as compared with the first embodiment. In the graph of FIG. 13, three peaks "G31", "G32" and "G33" of the deceleration of the passenger's head appear. If desired, more than two explosion units may be used for achieving a multistage retreating movement of the steering wheel 11.

Figure 14:
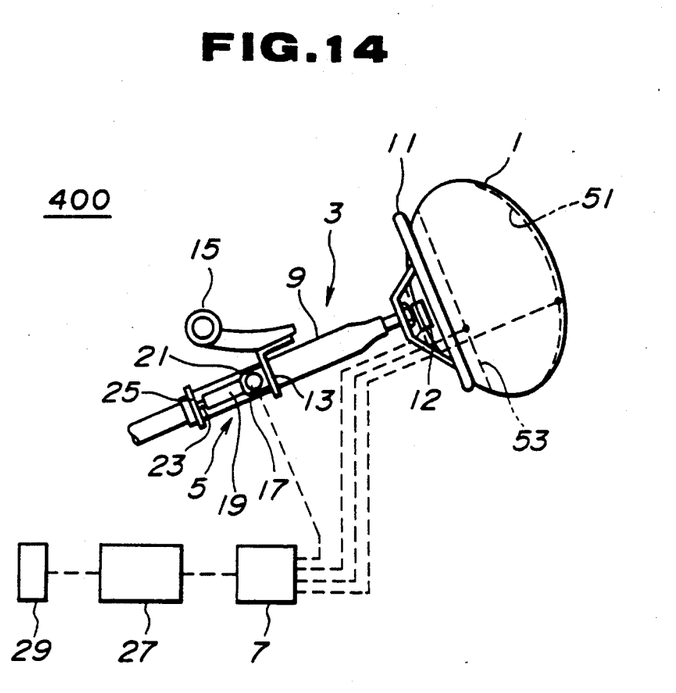
FIG. 14 is a view similar to FIG. 1, but showing a fourth embodiment of the present invention.
Figure 15:
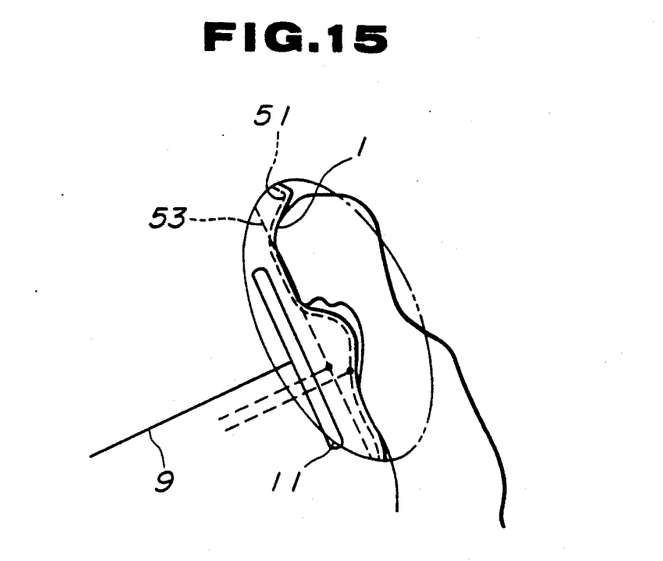
FIG. 15 is a schematic illustration showing a condition wherein a passenger is actually restrained by the restraining device of the fourth embodiment.

Referring to FIGS. 14 and 15, particularly FIG. 14, there is shown a fourth embodiment 400 of the present invention.

In this fourth embodiment, the timing for retreating the steering wheel 11 is determined by sensing the degree by which an upper portion of the passenger is sunk into the inflated air-bag 1 upon a vehicle collision. That is, as is seen from FIG. 15, the front portion of the air-bag 1 has an electrically conductive layer 51 coated on an inner surface thereof. A metal mesh 53 is installed within the air-bag 1. The layer 51 and the metal mesh 53 are independently connected to the timing adjusting circuit 7. The timing adjusting circuit 7 issues an ignition instruction signal to the igniters of the explosion units 17 when the layer 51 is brought into contact with the metal mesh 53. Of course, when the air-bag 1 is kept folded in the center pad of the steering wheel 11, such contact does not induce the signal issuance from the timing adjusting circuit 7.

Upon a vehicle collision, the air-bag inflater 12 is first ignited for inflating the air-bag 1. With this, the air-bag 1 instantly restrains an upper portion of the passenger who is forced to incline forward and bump against the bag 1. When, due to this bump, the inflated air-bag 1 is deformed to such a degree as to induce the contact between the conductive layer 51 and the metal mesh 53, the explosion units 17 are ignited for retreating the steering wheel 11. Thus, substantially the same advantageous function as that of the first embodiment is achieved in this fourth embodiment.

Figure 16:
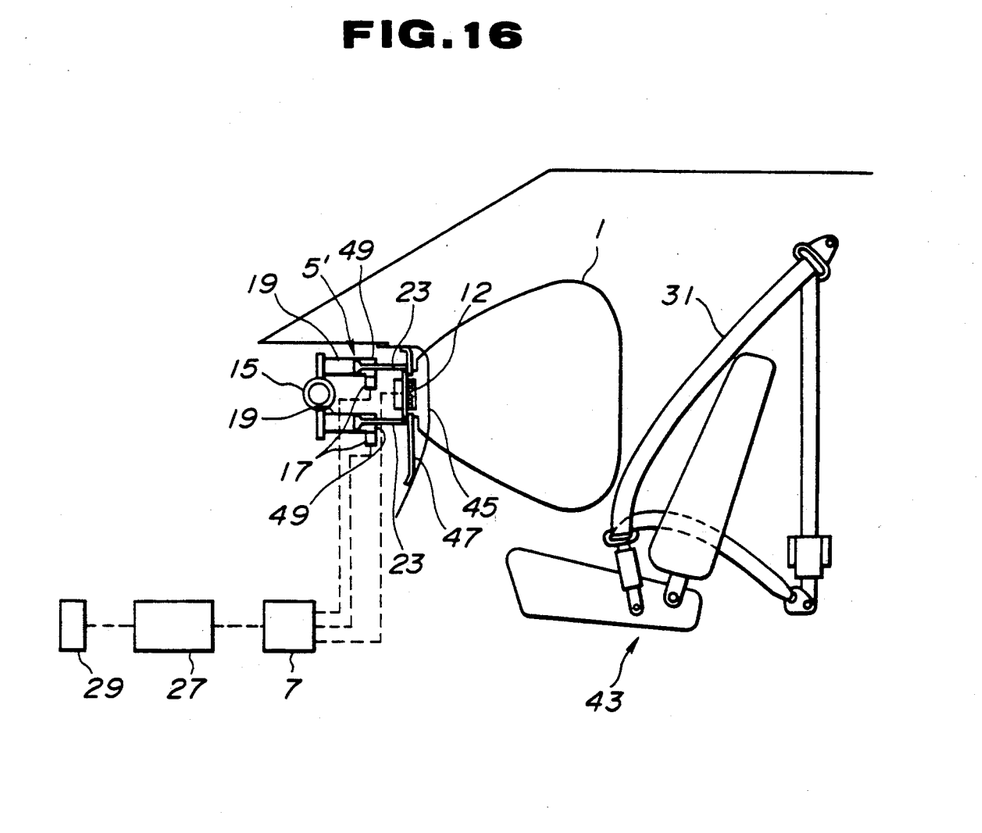
FIG. 16 is a schematically illustrated side view of an air-bag type restraining device applied to a driver-partner's seat, which is a fifth embodiment of the present invention.

Referring to FIG. 16, there is shown a fifth embodiment 500 of the present invention. In this embodiment, the restraining device is applied to a driver-partner's seat 43.

In this fifth embodiment, an air-bag 1 is mounted to a base plate 47 which is installed behind an instrument panel 45 of the vehicle. The air-bag 1 has an inflater 12 mounted thereto. The instrument panel 45 has a mechanically weakened portion which is broken upon inflation of the air-bag 1.

Within the instrument panel 45, there is mounted a base plate retreating device 5' which functions to instantly retreat the base plate 47 upon a vehicle collision. Similar to the restraining device 100 of the first embodiment, the base plate retreating device 5' comprises two parallel piston units each including a cylinder 19, a piston installed in the cylinder 19 and a piston rod 23 extending from the piston. Although not shown in the drawing, the interiors of the cylinders 19 are communicated through a conduit. Base portions of the two cylinders 19 are connected to fixed members of the vehicle body and leading ends of the piston rods 23 are secured to the base plate 47. Two explosion units 17 are connected to the interiors of the cylinders 19 through respective joint portions 49. Igniters of the air-bag inflater 12 and igniters of the two explosion units 17 are connected to the timing adjusting circuit 7.

Operation of this fifth embodiment 500 is substantially the same as that of the first embodiment. That is, upon a vehicle collision, the air-bag inflater 12 is ignited first for inflating the air-bag 1 and thereafter the two explosion units 17 are ignited to retreat the base plate 47 on which the air-bag 1 is mounted. Thus, substantially the same function as that of the first embodiment is achieved in this fifth embodiment.

As will be understood from the foregoing description, in the present invention, the retreat of the air-bag holder (viz., the steering wheel 11 or the base plate 47) starts after the air-bag 1 is inflated to such a degree as to effect an initial restraint to the passenger.

What is claimed is:

1. An air-bag type passenger restraining device for use in a motor vehicle having a seat, comprising:
   a vehicle collision detecting means which issues a first instruction signal when detecting a vehicle collision;
   an air-bag which is located in front of said seat and instantly inflated when receiving a second instruction signal;
   an air-bag retreating device which instantly retreats said air-bag in a direction away from said seat when receiving a third instruction signal; and
   control means for producing said second and third instruction signals upon receiving said first instruction signal, said control means issuing said third instruction signal for starting said air-bag retreating device after said air-bag is inflated due to issuance of said second instruction signal therefrom.

2. An air-bag passenger restraining device as claimed in claim 1, in which said control means comprises:
   means for causing, when said air-bag is inflated due to issuance of said second instruction signal, the inflated air-bag to effect an initial restraint to a passenger on said seat to such a degree as to allow a part of the passenger to be lightly sunk into the air-bag.

3. An air-bag type passenger restraining device as claimed in claim 2, in which said air-bag retreating device comprises:
   a first member axially movable together with said air-bag;

a second member secured to a fixed portion of the vehicle; and a mover unit for moving said first member relative to said second member when energized.

4. An air-bag type passenger restraining device as claimed in claim 3, in which said air-bag is fully inflated when said second instruction signal is issued from said control means.

5. An air-bag type passenger restraining device as claimed in claim 4, in which said air-bag retreating device retreats said air-bag to a given retreated position at once.

6. An air-bag type passenger restraining device as claimed in claim 5, in which said air-bag is equipped with a single inflater.

7. An air-bag type passenger restraining device as claimed in claim 6, in which said control means includes timer means by which the issuance of said third instruction signal is delayed by a given time as compared with that of said second instruction signal.

8. An air-bag type passenger restraining device as claimed in claim 7, in which said first member of said air-bag retreating device is a steering column, said steering column having thereon a steering wheel on which said air-bag is mounted.

9. An air-bag type passenger restraining device as claimed in claim 7, in which said first member is a base plate which is axially movably disposed behind an instrument panel of the vehicle.

10. An air-bag type passenger restraining device as claimed in claim 6, in which said control means has a switch means which comprises:

a first electrically conductive member attached to an inner surface of said air-bag;

a second electrically conductive member installed in said air-bag, said first and second electrically conductive members being brought into contact with each other when the air-bag in inflated condition is deformed by a certain degree; and means for actuating said air-bag retreating device when the contact between said first and second electrically conductive members occurs.

11. An air-bag type passenger restraining device as claimed in claim 4, in which said air-bag retreating device retreats said air-bag to a given retreated position in an intermittent manner.

12. An air-bag type passenger restraining device as claimed in claim 11, in which said mover unit of said air-bag retreating device comprises:

two parallel piston units each including a cylinder, a piston operatively disposed in said cylinder and a piston rod extending from said piston, said piston rod being secured to said first member and said cylinder being secured to said second member; and two explosion units each including an explosive and an igniter, said explosion units being respectively connected to the cylinders of said piston units.

13. An air-bag type passenger restraining device as claimed in claim 12, in which when said third instruction signal is issued by said control means, the igniter of one of said explosion units is ignited and then the igniter of the other explosion unit is ignited.

14. An air-bag type passenger restraining device as claimed in claim 3, in which when said second instruction signal is issued, said air-bag is lightly inflated and when said third instruction signal is issued for actuating said air-bag retreating device, said air-bag is fully inflated.

15. An air-bag type passenger restraining device as claimed in claim 14, in which said air-bag is equipped with first and second inflaters each including an igniter.

16. An air-bag type passenger restraining device as claimed in claim 3, in which said mover unit comprises:

two parallel piston units each including a cylinder, a piston operatively disposed in said cylinder and a piston rod extending from said piston, said piston rod being secured to said first member and said cylinder being secured to said second member; and two explosion units each including an explosive and an igniter, said explosion units being respectively connected to the cylinders of said piston units.

17. An air-bag type passenger restraining device as claimed in claim 16, in which the interiors of the two cylinders are communicated with each other through a conduit member.

18. An air-bag type passenger restraining device as claimed in claim 1, in which said control means comprises:

a judge circuit which, by analyzing an information signal from said vehicle collision detecting means, issues an instruction signal when judging that said air-bag and said air-bag retreating device should be operated; and a timing adjusting circuit which issues said second and third signals in a controlled timing when receiving said instruction signal from said judge means.

* * * * *